J. R. GAMMETER.
BALLOON FABRIC.
APPLICATION FILED NOV. 17, 1915.

1,247,658.

Patented Nov. 27, 1917.

INTERWOVEN BANDS OF UNWOVEN FIBROUS THREADS
WOVEN FABRIC
VULCANIZED RUBBER

INVENTOR.
J. R. Gammeter
BY Robert M. Pierson
ATTORNEY

UNITED STATES PATENT OFFICE.

JOHN R. GAMMETER, OF AKRON, OHIO.

BALLOON FABRIC.

1,247,658.   Specification of Letters Patent.   Patented Nov. 27, 1917.

Application filed November 17, 1915. Serial No. 62,058.

*To all whom it may concern:*

Be it known that I, JOHN R. GAMMETER, a citizen of the United States, residing at Akron, in the county of Summit and State of Ohio, have invented certain new and useful Improvements in Balloon Fabrics, of which the following is a specification.

This invention relates to composite fabrics consisting of one or more strength-giving plies of thread or fibrous material, together with a different material, such as rubber, adapted to hold the threads in place and also preferably to act as an impervious layer; and its object is to provide a flexible fabric of increased strength and durability in proportion to its weight, whereby it is especially adapted for the construction of balloons, though also usable for other purposes.

Of the accompanying drawings.

Figure 1:
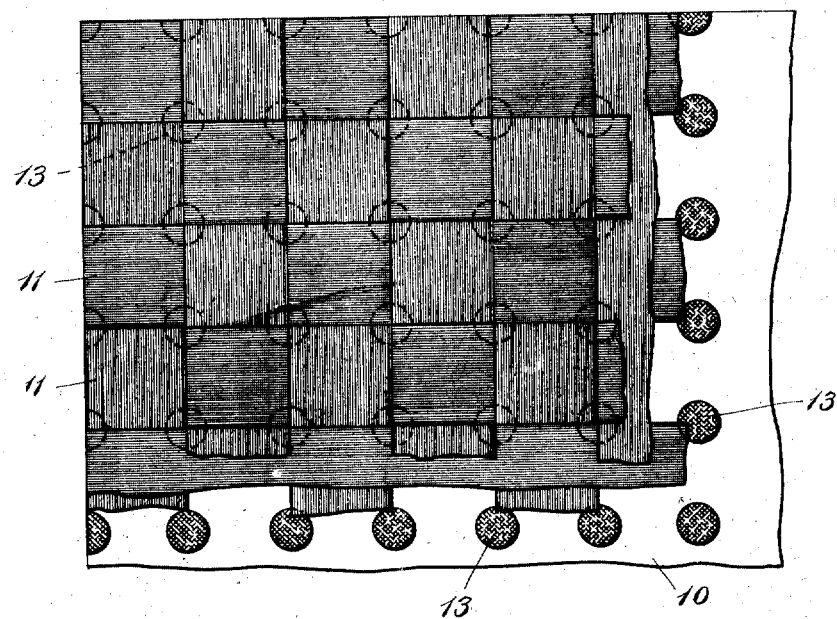
Figure 1 represents a plan view of my improved fabric, partly dissected along two margins.
Figure 2:
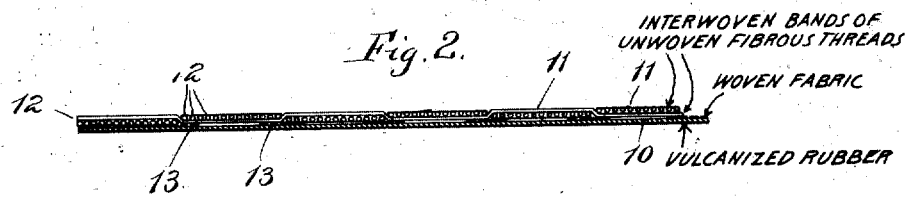
Fig. 2 represents an enlarged cross-section.

The impervious layer 10 preferably consists of a thin sheet of vulcanized rubber of the grade known as "pure gum", and the strength-giving layer consists of interlaced or woven bands 11, each composed of a large number of parallel threads 12 of any suitable fiber, such as cotton, linen, silk, etc. In order to keep the threads in the form of a band before and during the process of weaving the bands together, they may be caused to adhere by passing them through rubber cement, a method which has several advantages over other methods of tying the threads together, such as the use of filling threads, among which are the fact that it is cheaper, and that it allows the threads to lie straight and close together, thus giving the maximum degree of strength; but the invention is not wholly limited to a rubber binder.

At the corners of the squares formed by the edges of the interwoven bands I locate small disks 13 of any suitable material, preferably woven fabric, in order to close up the small holes which would otherwise be left in the strength-giving band layer at these corners, these disks being cemented both to the rubber layer 10 and to the band layer.

The process of making this fabric is to lay on a suitable support a sheet of rubber, either partly or fully vulcanized, to form the impervious layer 10, cover its upper surface with rubber cement, and then stick the fabric closure disks 13 in place at the proper points, after which the surface and disks are given another coating of cement, and the layer of thread bands 11 is then applied. If the applied rubber sheet 10 is only partly vulcanized, then the fabric, balloon bag or other structure is given a final heating in a suitable dry room or chamber. The preferred mode of applying the band layer, especially in the manufacture of a balloon where the fabric has to be shaped to a curved surface, is to weave the thread bands 11 together as they are being laid upon the cement-covered surface of the rubber layer 10 and the reinforcing disks 13, the desired shape being imparted by previously mounting the rubber layer 10 upon a form having the shape of a section of the balloon. Such method of balloon making however is not specifically made the subject of the present application.

Various modifications may be made without departing from my invention.

I claim:

1. A composite fabric for balloons, etc., comprising a layer of flexible impervious material, and an adherent strength giving layer of interwoven bands of fibrous threads.

2. A flexible composite fabric comprising a sheet of vulcanized rubber, and a layer of interwoven bands of threads cemented thereto.

3. A composite fabric comprising an impervious layer, an adherent layer of interwoven bands of threads, and means for closing the small holes at the corners where the edges of the bands cross each other.

4. An impervious fabric comprising a layer of vulcanized rubber, an adherent layer of interwoven bands of threads, and interposed disks covering the corners where the edges of the bands cross each other.

5. A composite fabric for balloons, etc., comprising a layer of rubber, disks of woven fabric cemented thereto, and interwoven bands of threads cemented to said rubber layer and said disks, the latter covering the corners where the edges of the bands cross each other.

6. A balloon fabric comprising rubberized interwoven bands of parallel unwoven fibrous threads, and an adherent sheet of vulcanized rubber covering one side of the layer formed by the interwoven bands.

7. A composite fabric for balloons, etc., comprising a layer of interwoven rubberized bands of unwoven-parallel fibrous threads, a layer of vulcanized sheet-rubber cemented to the band layer, and a series of interposed woven-fabric disks covering the corners where the edges of the bands cross each other.

In testimony whereof I have hereunto set my hand this sixteenth day of November, 1915.

JOHN R. GAMMETER.